United States Patent [19]

Buchar

[11] Patent Number: 4,555,621

[45] Date of Patent: Nov. 26, 1985

[54] ILLUMINATION CONTROL SYSTEM UTILIZING AN INTEGRATING FEEDBACK DETECTOR

[75] Inventor: Wayne A. Buchar, Rochester, N.Y.

[73] Assignee: Xerox Corporation, Stamford, Conn.

[21] Appl. No.: 507,614

[22] Filed: Jun. 24, 1983

[51] Int. Cl.[4] .................... G01J 1/32

[52] U.S. Cl. .................... 250/205; 250/227

[58] Field of Search .................... 250/205, 227; 355/35, 355/68; 358/293; 315/149

[56] References Cited

U.S. PATENT DOCUMENTS

| | | | |
|---|---|---|---|
| 3,679,306 | 7/1972 | DuBois et al. | 355/68 |
| 3,949,226 | 4/1976 | Dugan et al. | 250/354 |
| 4,024,428 | 5/1977 | Bachur et al. | 315/151 |
| 4,095,890 | 6/1978 | van Herten | 355/14 |
| 4,124,294 | 11/1978 | Nakamura | 355/68 |
| 4,255,046 | 3/1981 | Corona | 355/68 |
| 4,406,530 | 9/1983 | Hasegawa et al. | 250/205 |

*Primary Examiner*—David C. Nelms
*Assistant Examiner*—J. Gatto

[57] ABSTRACT

An illumination detector is positioned adjacent one surface of a wedge-shaped light pipe which is optically coupled to a mirror in a scanning system. The light coupled into the light pipe is representative of the illumination reflected from a document scanning plane, yet is totally internally reflected from the angled surface of the light pipe to produce a uniform, integrated illumination level at the photosensor. This photosensor output represents an exposure level used to adjust the output of a document illumination power supply.

4 Claims, 6 Drawing Figures

ILLUMINATION CONTROL SYSTEM UTILIZING AN INTEGRATING FEEDBACK DETECTOR

BACKGROUND

The present invention relates to an illumination scanning system for an electrophotographic printing machine and, more particularly, to a novel illumination detector utilized in a feedback control system.

Generally, in electrophotographic printing systems, originals placed on a platen are incrementally scanned by an illumination source. The source is either maintained stationary and the platen (and document) moved past the source, or else the illuminator and associated mirror, or mirrors, are moved in a plane parallel to, and beneath, the platen to incrementally scan the entire document. The image reflected from the document may be folded along an optical path by one or more mirrors and projected upon a charged photosensitive surface, such as a drum photoreceptor. A latent image of the original document, formed on the photosensitive surface, can then be developed and fixed to produce a final copy.

When the exposure subsystem is initially set up, the illumination system, comprising some type of linear lamp (fluorescent, tungsten etc.) is supplied sufficient power to produce an optimum exposure level of the image at the photosensitive surface. However, with extended operation of the reproduction device, the optical system, the mirrors which fold the optical image, and the lens itself accummulate dirt and other contaminants. The presence of these contaminants results in reduced levels of exposure at the imaging plane since the light rays constituting the reflected image are partially absorbed and/or deflected by these contaminants. This reduced exposure level, if left uncorrected, would result in progressively greater underdevelopment of the latent images being formed on the photoreceptor.

The present invention is therefore directed to an improved optical scanning system wherein a feedback system is incorporated for the purpose of measuring the exposure level at an image plane and providing compensation for decreased image exposure. The feedback system includes a photosensor located within a light guide device. The photosensor positioned near the imaging plane, senses an integrated illumination level and generates a signal to increase the output of the illumination source when a falloff in the exposure level is detected. More particularly, the invention is directed to a document scanning system comprising:

an illumination source adapted to provide incremental line illumination of a document in an object plane;

a projection lens for projecting a light image of said original toward a photosensitive image plane;

means for providing relative motion between said document and said illumination source;

at least one mirror positioned on the image side of said projection lens and along the optical path, said mirror adapted to reflect the projected incrementally scanned image lines onto said image plane, said mirror further adapted to incorporate an optically transparent area extending along the height of said mirror;

an illumination detector comprising a light guide member for coupling light entering said transparent area and adapted to direct said coupled light onto a photosensor contained within said member, said photosensor generating an output signal representative of the level of the illumination impinging thereon; and control means for adjusting the output of said illumination source in respose to said photosensor output signal.

DRAWINGS

DESCRIPTION

Figure 1:
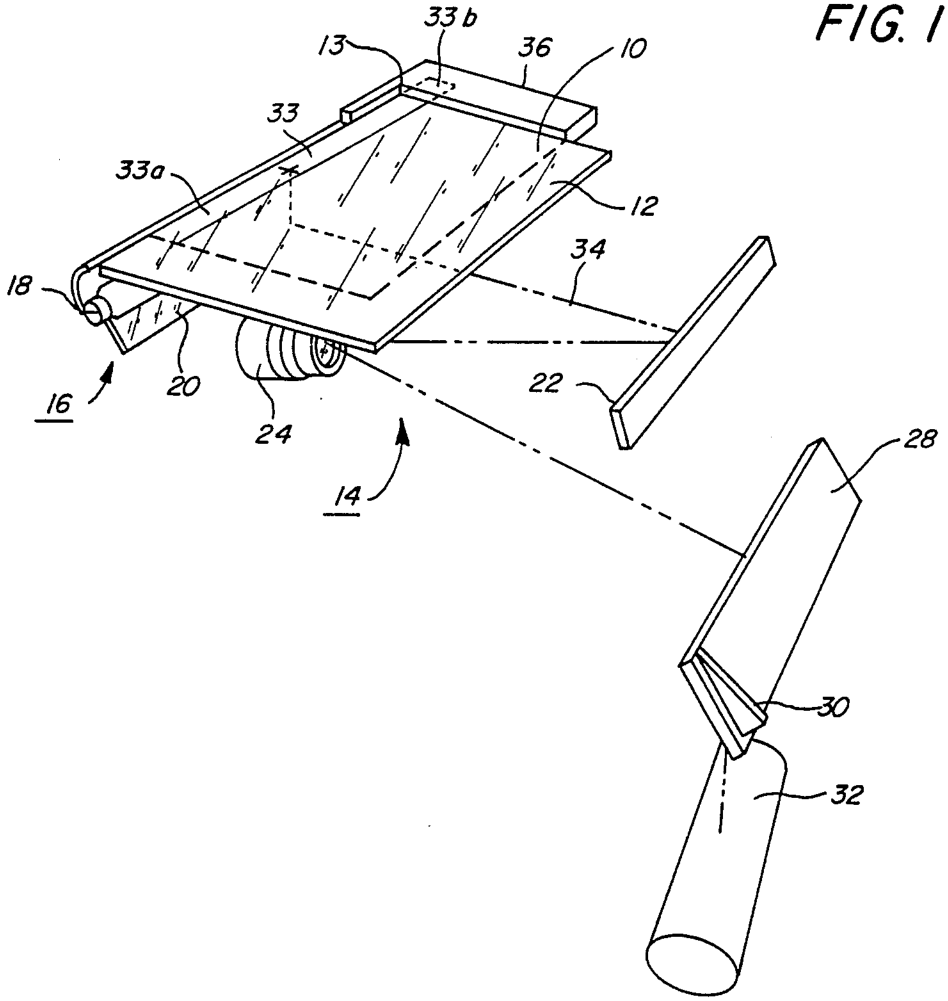
FIG. 1 represents a schematic view of a scanning system utilizing the integrating detector of the present invention.
Figure 2:
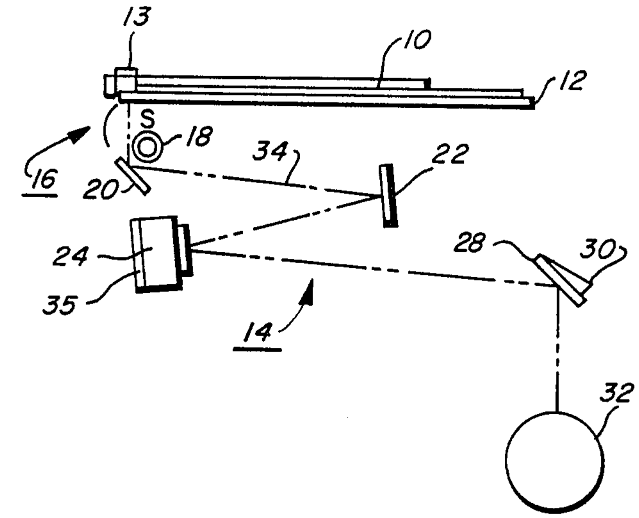
FIG. 2 is a side perspective view of the scanning system of FIG. 1.

Referring now to FIGS. 1 and 2 there is shown a schematic perspective and a side view, respectively, of a scanning system utilizing the feedback detector of the present system. The scanning system is but one representation of many types of scanning systems in which the detector of the present invention can be used and it is not intended to exclude these other systems.

As shown in FIGS. 1 and 2 an original document 10 to be copied is placed on a fixed transparent platen 12 and registered at registration guide 13. An optical scanning system 14 comprises a moving illumination assembly 16, which includes a linear fluorescent lamp 18 and associated mirror 20, a moving mirror 22, fixed half lens 24 and image mirror 28. An integrating light pipe detector 30 whose purpose is described in further detail below, is attached to one end of mirror 28. The scanned image is projected onto the charged surface of a photoreceptor drum 32.

In operation, at the start of a scanning cycle, the illumination assembly 16 is in a home position S wherein lamp 18 illuminates an extended incremental strip 33 on the underside of the platen. Strip 33 comprises strip 33*a* extending along the length of document 12 and strip 33*b* lying beneath registration guide 13. An assembly 16 moves in a parallel path beneath the platen (by motor means not shown, but conventional in the art), a continuous succession of incremental areas of the document, and of the adjacent area under the registration edge, are scan-illuminated. Light rays of these scanned strips are reflected by mirror 20 towards compensating mirror 22, which is moving at ½ the speed of mirror 20, along optical path 34. The rays are reflected from mirror 22, into lens 24. Lens 24 is basically an off axis objective which collects light from one side of the central axis and forms the images on the opposite side of the axis. A mirror 35 is positioned at the lens stop position to reverse the light rays as they pass through the lens components. The projected image is reflected by drum mirror 28 and focused on the photosensitive surface of drum 32. Assembly 16 and drum 32 move at the same rate of speed and, at the end of scan, a flowing light image of the original document has been recorded on the drum surface. A portion of the light incident on mirror 28 representing the integrated radiant energy along the bottom of the registration edge enters light pipe detector 30 and is utilized in a manner described below.

At the initial set up of the scanning system 16, the required exposure level at the surface of drum 32 is determined and the power input to lamp 18 (from a power supply 80, FIG. 6) is set at the level required to provide that exposure level. With continued operation, various contaminants are inevitably introduced into the space occupied by the optical system components (lens, mirrors) even though the components are typically contained within some form of housing. The contaminants may include dust, stray particles of developer and the like. These contaminants may be deposited on the surface of mirrors 20, 22, 28 and the entrance face of lens 24. The contaminated optical components result in some absorption of the incident light rays and/or deflect a portion of such rays away from the optical path. The net result is a progressive deterioration (reduction) in the exposure level near the photoreceptor surface. It is therefore necessary to compensate for this exposure reduction. This is accomplished, according to the invention, by monitoring the exposure level at the drum surface and generating a feedback signal to the lamp power supply which will call for additional input to the lamp to increase its illumination and hence restore the exposure level to optimum. This feedback mechanism incorporates, according to the invention, a strategically placed integrating detector 30, shown in FIGS. 1 and 2 as attached to the back of mirror 28. Mirror 28 has been adapted to optically couple a portion of the incident light into the detector as will be described below.

Figure 3:
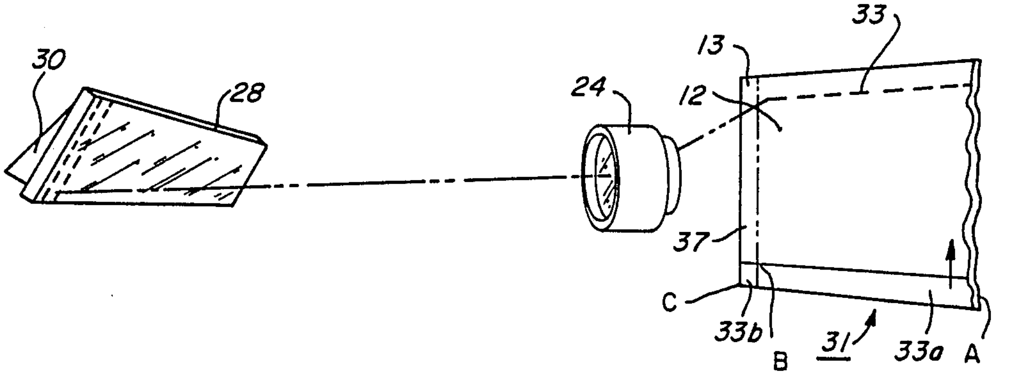
FIG. 3 is a partial view of FIG. 1 showing only the document platen, projection lens, and image mirror incorporating the integrating detector.

Referring to FIG. 3, platen 12 and lens 24 are represented without the remainder of the optical system in order to better illustrate the path of the light incident on detector 30. As shown in FIG. 3, the incremental strip 33 illuminated by assembly 16 extends from edge A to registration edge B resulting in a previously identified strip 33*a*. The actual scanned area however is contained within strip AC (strip 33). Strip BC (strip 33*b*) is therefore outside of the optical document imaging area but within the field of view of lens 24. Seated above strip BC is one end of registration guide 13, the underside of which is coated with a white substance to simulate the white background of a document. Extending segment BC in the direction of scan forms a linear non-image scan sector 37 of constant width BC and with a length corresponding to the document width. It is apparent then that during a scan cycle, light rays reflected from scan sector 37 will be acted upon by the same components which are transmitting the image rays (AC) to the photoreceptor drum. It therefore follows that whatever contaminants have settled on the mirros and lens will equally affect the illumination level of the image rays and the non-image rays from sector 37.

The location of detector 30 can now be better appreciated. As shown in FIGS. 1, 2 and 3 detector 30 is placed at the edge of mirror 28 and in the path of rays reflected from the non-image scan sector 37. The dimensions of detector 30, as will be seen below, are selected so as to couple light reflected from sector 37 into the body of detector 30.

Figure 4:
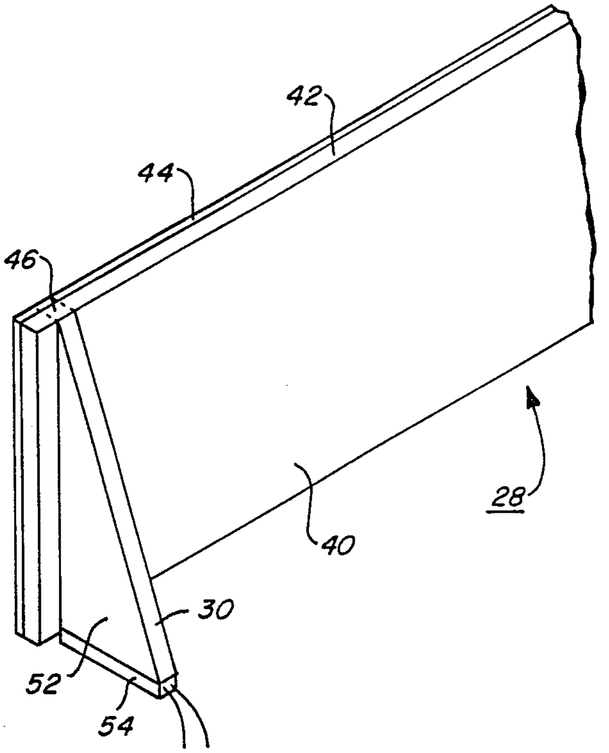
FIG. 4 is an enlarged view of the integrating detector mounted on the back surface of the image mirror.
Figure 5:
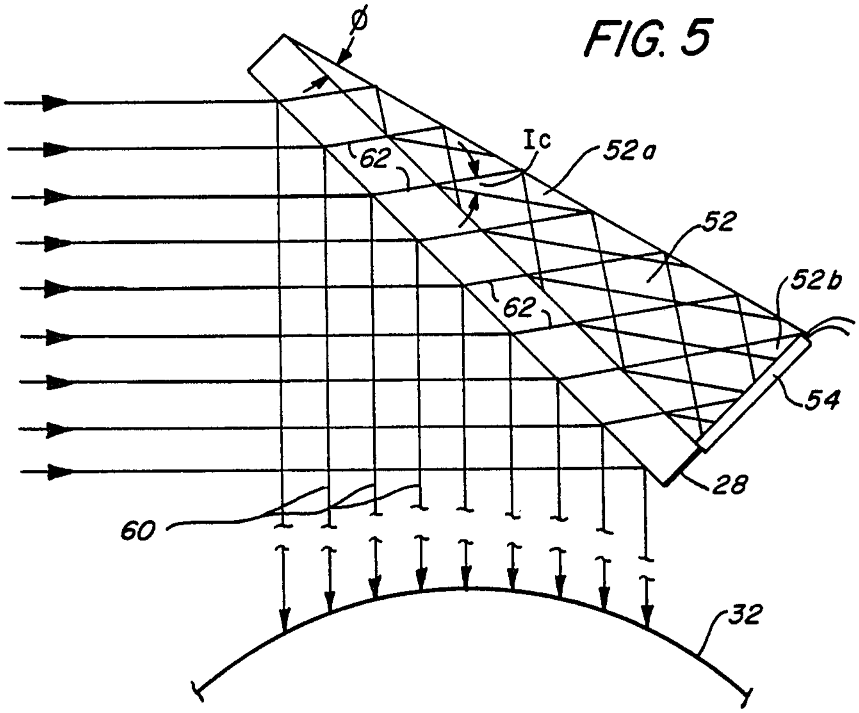
FIG. 5 is a side view of the image mirror showing the path of the image rays incident on the detector.

The construction details of mirror 28 and detector 30 are considered in detail with reference to FIGS. 4 and 5. Referring to FIG. 4, it is seen that mirror 28 comprises a unitary glass body 40 having a front surface 42 coated with a reflective coating 44 such as chrome or silver.

Figure 6:
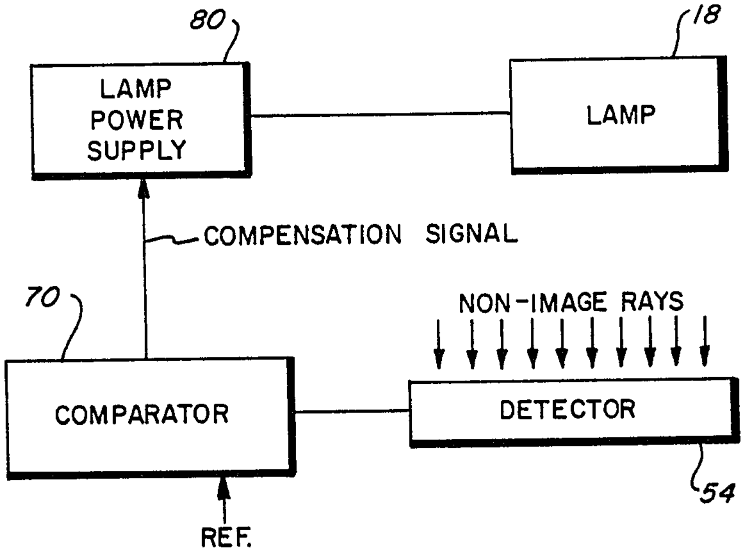
FIG. 6 is a block diagram of a feedback circuit to adjust power input to the illumination source.

Surface 40 is completely coated except for a rectangular strip 46 extending the vertical height of the mirror. Strip 46 corresponds, dimensionally, to non-image scan sector 37 (FIG. 3). Detector 30 comprises a wedge-shaped optically transparent member 52 which has a photosensor detector 54 (which can be a Vactec VTS 2018 Silicon Solar Cell) lying in a plane parallel to the base of member 30. It is apparent that, if the bundle of light representing a scanned line is incident on the front of mirror 28, all of the light will be reflected from the mirror excepting for the portion passing though strip 46. This slightly defocused light will pass through body 40 of mirror 28 and enter into member 52. The situation at this point is shown in greater detail in FIG. 5. The bundle of light rays reflected from mirror 28, representing the scanned images, are shown as ray bundle 60. The non-image light rays reflected from sector 37 passing through the body 40 of mirror 28 and entering into the body 52 of member 30 are designated as 62. The rays are refracted at some angle determined by the coefficient of refraction of mirror body 40. As they emerge from mirror body 40, they are reflected from surface 52*a* of member 52. The path of the light rays upon entering the body of member 52 are governed by the general principles of total internal reflection which states that total internal reflection occurs when the angle of incidence of light rays within a relatively dense medium is equal to or greater than a critical angle. The critical angle $I_c$ is given by the expression $I_c = \arcsin n'/n$ where n is the index of refraction of the relatively denser medium (here light pipe member 52) and n′ is the index of refraction of the less dense medium (here the mirror body 40). If wedge angle ¢ is chosen properly, the light rays will be totally internally reflected from all sides of member 52. Repeated internal reflection along the surfaces of member 52 results in a uniform, integrated level of illumination along base 52*b*, and hence along detector 54. Detector 54 thus responds to the integrated incidence of the scanned line over the slit width. This illumination level is sensed by detector 54 which generates a signal representative of this level. Referring to FIG. 6, this signal can then be compared against a reference signal in a standard comparator circuit 70 which is initially calibrated to represent the optimum exposure level. Differences between the generated and reference signal are represented by a compensation signal which is applied to lamp power supply 80 and causes an increase in the power input to lamp 18 until the exposure level reaches once again the optimum level.

In summary, Applicants have provided a novel method of maintaining optimum exposure at an image plane. The effect of contaminants on optical components within the system is compensated for by continually monitoring the illumination level by means of a highly efficient integrating feedback device strategically placed outside of the imaging path. The embodiment described herein is preferred, however, it is contemplated that further variations and modifications within the purview of those skilled in the art can be made herein. For example, although the optical system is shown for a 1X magnification, by suitable adaptation, magnification changes can be implemented. As the system magnification changes, the imaged line area changes with proportionally increasing brightness; thus, the integrated illumination level at the photosensor remains constant.

As another example, the optical system may consist of fewer, or greater numbers of optical components. A conventional, rather than a half-lens, may be used. As a still further example, the invention can be utilized in a system where the optical components are fixed and the platen adapted for motion to include the scanning function.

As a still further example, the exterior surfaces of light pipe member 52 can be coated with a reflective material so as to improve the efficiency of the detector.

What is claimed is:

1. A document scanning system comprising:

an illumination source adapted to provide incremental line illumination during a scan cycle of a document at an object plane;

a projection lens for projecting incremental line images reflected from said document along an optical path onto a photosensitive image plane forming a latent image of the document on the image plane during the scan cycle;

at least one mirror positioned on the image side of said projection lens and along the optical path, said mirror adapted to reflect the projected incrementally scanned image lines onto said image plane, said mirror further adapted to incorporate an optically transparent area extending along the height of said mirror;

an illumination detector comprising a light guide member for coupling light entering said transparent area and adapted to direct said coupled light onto a photosensor contained within said member, said photosensor generating an output signal representative of the integrated level of the illumination impinging thereon during said scan cycle; and control means for adjusting the output of said illumination source in response to said photosensor output signal.

2. The scanning system of claim 1 wherein said incremental line illumination comprises an image area corresponding to the document dimensions and a non-image area corresponding to an area immediately adjacent said imaging area, and wherein said optically transparent area of said mirror is positioned so as to be in a path incident to light projected from said non-imaging area.

3. The scanning system of claim 1 wherein said light guide member has a wedge configuration with said photosensor located adjacent the base thereof and wherein the interior surface is inclined at an angle such that incident light is totally internally reflected from said interior surface towards said photosensor.

4. The scanning system of claim 1 wherein said light guide member has its exterior surface coated with a reflective material.

* * * * *